Dec. 4, 1956 P. L'HEUREUX 2,772,813
GREASE CAN RECEIVING GREASE EJECTOR
Filed Nov. 7, 1952

INVENTOR.
Phillaus L'Heureux
BY

United States Patent Office 2,772,813
Patented Dec. 4, 1956

2,772,813

GREASE CAN RECEIVING GREASE EJECTOR

Phillaus L'Heureux, Omaha, Nebr.

Application November 7, 1952, Serial No. 319,358

4 Claims. (Cl. 222—82)

This invention relates to grease ejection equipment and more particularly it is an object of the invention to provide an improved grease ejection unit using compressed air to propel the grease.

A particular object of the invention is to provide novel means of attaching the grease ejector unit to a grease bucket whereby the piston, employed for pushing the grease toward the intake port of a grease pump, rides on its own walls independently of the inner walls of the grease bucket.

It has been a common experience for farmers and contractors that in very cold weather the suction of the grease pump pulls the grease only out of the center of the bucket, the grease around the edges of the bucket being hard and clinging to the sides of the bucket in greased masses. This makes it necessary to warm up the grease bucket before using.

Warming a grease bucket involves labor and time and in some particular uses it is useless for the reason that the bucket would only become too cold again by the time it could be brought to the equipment from the place of heating it.

A further difficulty is that grease has been wasted often through the throwing away and casting aside of buckets still having in them as much as half of the grease still clinging to the sides of the bucket. Probably the worst disadvantage is that the time lost in heating of grease means that a whole machine is brought to a stop and prevented from operation, being held up for a considerable period of time. This is especially costly with large contracting equipment and is intolerably costly to the farmer also.

A particular difficulty with grease equipment of the prior art has been that the grease ejectors have had their own reservoirs. This means that it has been necessary for the farmer and the contracting equipment maintenance man to pour grease from cans in which grease is delivered into the reservoir container of the grease ejection equipment. This pouring is costly in time and labor and permits dirt and grit to become mixed with the grease through blowing in from the air and from a man's hands, and from the use of dirty sticks and the like by negligent workmen. Permitting even small amounts of dirt and grit to get in with the grease can cause the valves of the grease ejector to become clogged and to fail with attendant loss of time in taking the grease ejection equipment apart while machinery and implements have been left standing unproductive during such cleaning periods.

Still another disadvantage of the prior art practice has been in that dirt and grit have been permitted access to the bearings of expensive machinery whereby great loss is occasioned from abnormal wear. It is well known that throughout the country large amounts of dirt are being pumped into expensive bearings with a great loss of the country's industrial and farm equipment wealth.

Yet another disadvantage of the prior art practice of pouring grease from a container to the ejector reservoir has been in that air becomes mixed with the grease, forming air pockets, which mean incomplete greasing of the equipment as well as air locking of the grease ejector.

Another and serious disadvantage of the air pockets has been in that grease ejectors operate on a suction and vacuum principle whereby the presence of air pockets makes it necessary to reprime the pump of the grease ejector. This is a considerable job as it means the removal of the intake pipe from the grease reservoir and the packing of the grease into the end of the intake pipe for priming. Also, the priming itself means the loss of operating time for implements and contracting machinery. Also, it has been found to be particularly disgusting to operators in the field who, when they feel the urge to work under the pressure of time schedules, must instead be tangled up in a frustrating job of grease ejector priming and cleaning.

Yet a further factor is dust. In addition to grit and dirt there is much dust which becomes blown into grease reservoirs and delivery container when the grease is being poured from the container to the reservoir. Even dust is detrimental to bearings; it is, in fact, the ruination of bearings. Dust alone is a great cause of loss of the country's machine wealth. Theoretically a bearing can last far, far longer than they now do and one of the larger factors in the wearing out of bearings is dust.

A particular object of the invention therefore is to provide in a grease ejector a cylindrical housing having an open top and a closed bottom for receiving therein a piston with a spring behind it for driving the grease upwardly toward the intake opening in the top of the grease can. This construction has also the advantage that the sides of the grease bucket or grease can are reinforced, so to speak, as five pound grease cans are normally lightly built and are easily broken or rather bursted as the placing of a grease ejector on the top of a five pound can places an unusual weight and burden on the top of the can with the result that the cylindrical housing of this invention is necessary to further support the grease ejector thereabove.

Still another object is to make possible the more efficient use of five pound grease cans. Heretofore the more popular grease cans have been of 25 and 50 pound sizes because of the necessity to pour from the grease can into grease ejector reservoirs. When pouring small cans of the five pound size into grease ejector reservoirs, the operator consumes much time in the emptying of a large quantity of cans and therefore would rather pour only once from a larger container. However, it is easier to carry the five pound cans and this invention will make it possible for the operator to efficiently use the easier carried five pound cans through making it possible to use them without pouring.

Expressed in another way, one main objective is the making possible the use of a ready-made grease delivery can as the cartridge of the grease ejector. In still other words, the use of a grease delivery can as a grease reservoir, without the necessity of pouring into a separate grease reservoir.

A further object is the provision of a compressed air operated grease pump disposed inside of a compressed air tank whereby a saving of space is made possible for holding to a minimum the height of the grease ejector, to form a compact, portable assembly.

Still another advantage of the provision of having the grease pump in the air tank is in that air hoses and other air lines are eliminated. In the prior art such air hoses have been susceptible of leaking and their elimination means the elimination also of much costly trouble.

Yet another object of the invention is to provide a device for the purpose described which is sturdy and durable in construction, reliable and efficient in operation, and relatively simple and inexpensive to manufacture, assemble and utilize.

It is still another object of the invention to provide a grease ejector in which the component parts are built into one unit. In the prior art the several elements have been each separate, each unit requiring a separate mounting: the motor-compressor unit having a mounting, the air tank having a separate mounting, and the grease unit having a separate mounting. In a sense there are even separate mountings for the motor and compressor in that the compressor tank has had its own mounting in the prior art and the motor has had fittings or mounting units between the motor and the compressor tank, all at excessive expense.

Also another object is to provide a unit of much less size because of the elimination of these parts, and having a streamlined housing instead of many parts loosely connected for unwanted engagement and entanglement with other parts of equipment; and also having the advantage of streamlined appearance for providing a more appealing and marketable product, whereby purchases can be swifter and the day sooner reached when the majority of bearings are saved from much of their wear.

Still another object of the invention is to provide a power-operated air compression unit adapted for many other uses such as pumping air into implement tires, with especial advantages for emergency pumping of tires.

Still another object is to provide a power-operated air compressor unit which will be handy in emergencies for blowing on fuel lines to carburetors when such lines are clogged, clearing clogging foreign matter from carburetor jets, and clearing grease lines with air pressure.

Another object of the invention is to provide a grease can receiving portion for a grease ejector in which the grease can is disposed upside down during use and means are provided for punching an aperture into what would normally be the bottom of the grease can whereby an inlet opening of a grease pump can be placed at said aperture for drawing grease upwardly into said pump from said can, the upside down position of the can having the advantage that this makes it possible to have the intake opening of the pump closely adjacent to the plunger of the pump for more efficient pumping than would be possible if the intake opening of the pump were at the opposite end of the grease can from the pump.

Another object of the invention is to provide means for making possible the punching of an aperture into what would normally be the bottom of a grease can, the aperture punching means operating simultaneously with the locking of the ejector onto an upside down grease can.

Another object is to provide a grease ejector of construction such that the intake opening to the grease pump is close to the greast pump for eliminating the friction of the flow of grease through a long tube and for making a construction less requiring of precision in its manufacture.

It is well known that grease is handled well in filling stations and in factories and with indoor machinery but in the open fields the handling of grease is badly bungled. Therefore, a particular object is to provide a grease ejector especially adapted for greasing equipment and implements in dusty outdoor conditions.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
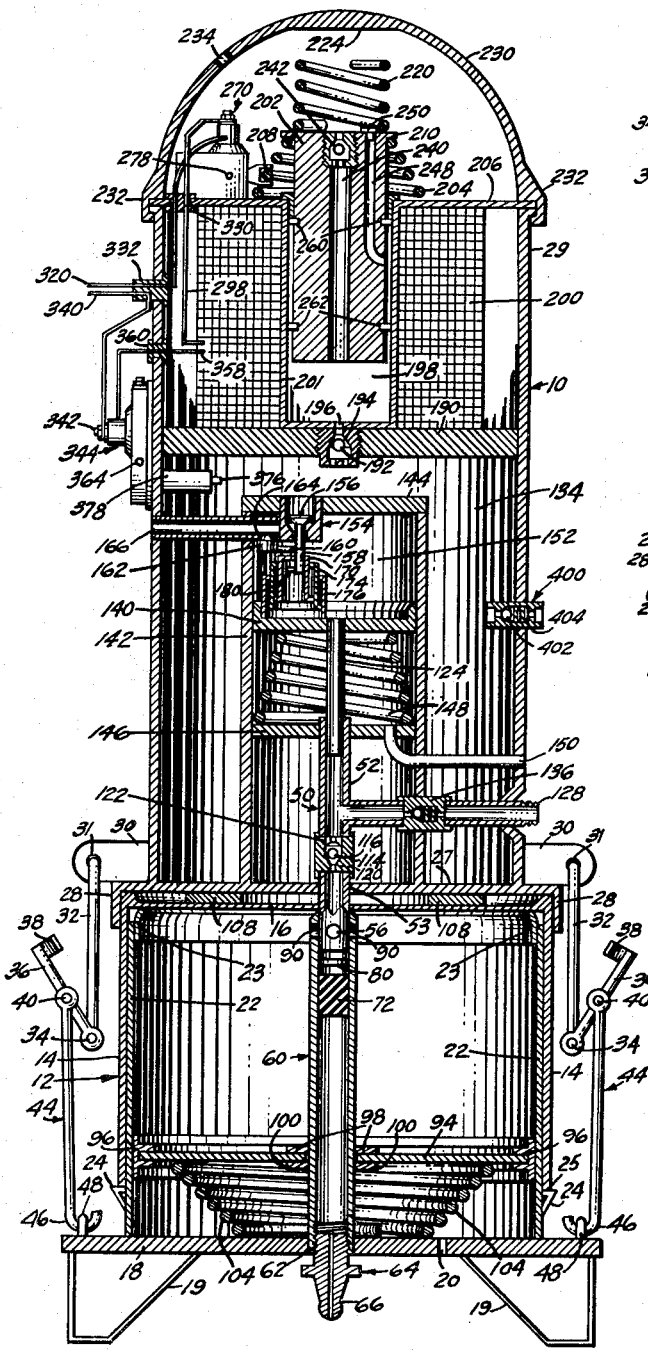
Figure 1 is a side elevation of the grease ejector of this invention with a forward portion thereof broken away for illustrating the remainder in cross section with the exception of two automatic switch mechanisms.

In Figure 1 the grease ejector unit of this invention is generally indicated at 10 and is shown holding a grease can 12 disposed in an inverted position with the cylindrical walls of the grease can shown at 14 connected by its bottom wall 16.

The lid of the grease can 12 has been removed prior to the placing of the grease can in the ejector as later described.

The grease ejector is provided with a horizontal bottom mounting plate 18 having legs 19 and having an aperture 20 therethrough for the entrance and exit of air for a purpose later described.

A cylindrical wall 22 is provided extending upwardly vertically from the mounting plate 18 to which it is attached. At the upper end of the cylindrical wall 22 an annular or circular gasket 23 is provided attached to the inner side of the upper end of the cylindrical wall 22. The gasket 23 is formed of a flexible material and is adapted to engage tightly against the inner side of the bottom wall 16 of the grease can 12.

The cylindrical wall 22 is of a size for snugly fitting against the inner side of the cylindrical wall 14 of the grease can 12.

On the outer side of the cylindrical wall 22 a circular rim 24 is provided having a horizontal upper surface against which the normally upper rim 25 of the inverted grease can 12 is received.

The grease ejector is provided with a horizontal wall 27 having a downwardly extending horizontal flange 28 around its outer side for fitting downwardly over the normally bottom end of the inverted can 12 with a snug fit.

The grease ejector further includes a cylindrically shaped outer wall or housing 29 extending vertically upward from and attached to the upper side of the horizontal wall 27.

The two ears 30 are fixed to the bottom end of the cylindrical wall 29 and are fixed to the upper sides of the horizontal wall 27 and extend outwardly projecting outwardly from the outer edge of the horizontal wall 27.

The ears 30 each have apertures 31 therein to which the hooked upper ends of the vertical members 32 are attached. The members 32 extend downwardly and are pivotally connected by pins 34 at their lower ends to handles 36. The handles 36 extend upwardly and outwardly as shown in Figure 1 in an inclined position with respect to the vertical and are provided at their upper ends with inwardly curved portions which are provided with hook ends 38 for hooking about the middle portions of the vertical members 32.

Between the upper curved portions of the handles 36 and the lower ends thereof pins 40 are provided for pivotally connecting the handles 36 to the upper ends of vertical bottom hook members 44. The bottom hook members 44 extend downwardly to hook shaped lower ends 46 which are in turn hooked through eyelets 48 attached to the upper side of the bottom horizontal mounting plate 18.

The grease ejector is further provided with a grease pump 50 disposed above the wall 27, the grease pump 50 having a main cylinder 52 extending downwardly through an aperture 53 in the wall 27.

Figure 4:
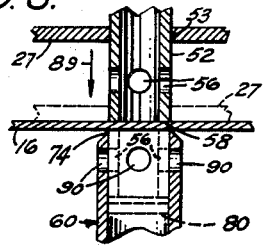
Figure 4 is a detail of the grease can cutting mechanism.

The lower end of the cylinder 52 extends through the wall 27 and projects downwardly therefrom a substantial distance whereby its lower end can be considered to be a punching or pressing member. The undersurface of the lower extremity of the cylinder 52 is flat and horizontal for providing a blunt surface to force downwardly upon the bottom 16 of the can 12, the flat blunt undersurface being shown at 58 in Figure 4.

The lower end of the cylinder 52 is provided with apertures 56 therethrough for admitting grease as later described.

Beneath the cylinder 52 and on the under side of the bottom 16 of the can 12 an elongated pipe 60 is provided, the pipe 60 being rigidly secured to the bottom plate 18. The lower end of the pipe 60 is internally threaded for receiving the externally threaded upper end of a nipple 64. The latter has a tapered lower end 66 onto which a hose can be placed for blowing compressed air through the pipe 60 to clear the pipe 60 of foreign matter. Also, it will be seen that the nipple or plug 64 is removable for the insertion of a rod, not shown, into the pipe 60 to clean it.

In the pipe 60 a filler plug 72 is provided which latter can be formed of any suitable material, preferably a resilient material such as synthetic rubber. The plug 50 tightly fits in the inside of the pipe 60 for preventing the escape of grease downwardly therethrough. The operation steps in the placing of the can 12 in the ejector will now be described.

First, the lid is removed from the can. Next, the cylindrical wall 22 is inserted downwardly into the can 12 as far as it will go until the sharp upper end of the pipe 60 engages the can bottom 16.

The upper end of the pipe 60 is sharpened in the form of a bevel extending upwardly and inwardly to a sharp circular cutting edge 74.

Then the can and the base of the ejector are inverted whereby the base can be stood on its legs 19. The upper end of the ejector is then placed on top of the can 12 with its blunt undersurface 58 of the cylindrical tube 52 disposed directly above the pipe 60 and with the downwardly extending flange 28 extending around the outer edges of the can 12. The hooks 46 are then placed in eyelets 48 and the levers 36 pulled upwardly until their upper ends have passed inwardly of the vertical members 32 whereby the pin 34 passes under the pin 40 and the over-center position is reached.

The upper ends of the arms 36 are then pushed inwardly until their hook ends 38 engage the sides of the bucket 14. The handles 36 will then tend to remain in the over-center position.

Optionally, the hooks 38 can be hooked around the member 32 for holding the arms 36 in their vertical positions.

As the arms 36 are pulled upwardly the blunt undersurface 58 of the cylindrical tube 52 is forced downwardly for causing the pointed upper edge 74 of the pipe 60 to cut a plug from the bottom of the can 12, one such plug being shown at 80 in Figure 1.

At the time when the rim 25 of the can has reached the top 24 on the wall 22 the lower end of the cylinder 52 will have moved downwardly into the pipe 60 until the apertures 56 will be opposite apertures 90 in the upper end of the pipe 60 whereby grease can flow through the apertures 56 and 90. Grease flowing through the apertures is assisted and pushed by a piston 94 horizontally disposed in the cylinder 22 and having a surrounding gasket 96 for tightly and slidably engaging the inside of the cylindrical wall 22. The piston 94 has a gasket 98 at its center for engaging the pipe 60 and another gasket 100 on the bottom side of the piston 94 for engaging the pipe 60.

Beneath the piston 94 is a coiled compression spring 104 which engages the bottom wall 18 and presses the piston 94 upwardly forcing grease through the apertures 90 and 56 into the cylindrical tube 52.

Between the bottom of the can 16 and the horizontal wall 27 an annular compressible gasket 108 is provided as best seen in Figure 1. The gasket 108 is compressed against the bottom 16 of the can 12 by the action of the arms 36.

As shown in Figure 1, the positions of the arms 36 are not quite in the over-center or lock position.

The pump 50 includes a valve 114 in the lower end of the cylinder 52. The valve 114 is a check valve having a ball 116 engageable against a seat 120 beneath the ball 116 whereby the ball 116 will plug the cylinder 52 by seating against the seat 120 at times when the plunger 124 of the pump 50 is moving downwardly. The valve 114 also has a stop ring 122 at its upper end to prevent the ball from escaping upwardly.

The pump 50 has an outlet pipe 128 extending from the main cylinder 52 horizontally outwardly through the side wall 29 which serves as the side wall of a compressed air chamber 134. The wall 29 is cylindrical in shape and extends upwardly from and is secured to the horizontal wall 27. The pipe 128 has a check valve therein indicated at 136 which is adapted to permit grease under pressure to pass outwardly of the pipe 128 but to prevent grease from entering the main cylinder 52 of the pump 50 from the pipe 128.

The plunger 124 of the pump 50 is attached to a piston 140 disposed in an air cylinder 142. The air cylinder 142 has its lower end secured to the horizontal wall 27. The air cylinder 142 is vertically disposed and has an upper wall 144 and a lower wall 146. Between the lower wall 146 and the piston 140 is a coiled spring 148 which forces upwardly on the piston 140. An air escape duct 150 is provided which interconnects the lower portion of the air chamber with the atmosphere. The duct 150 extends upwardly through the bottom 146 of the air cylinder 142 and extends outwardly through and is secured in the outer wall 29 of the air chamber 134.

In the upper end of the air cylinder 142 is a space 152 which latter is adapted to receive compressed air for forcing the piston 140 downwardly. A compressed air inlet valve is shown at 154 having a valve closure member 156 which is vertically movable and receivable in a seat. When the closure member 156 is up then air is free to enter the upper air cylinder portion 152 into the valve 154. When the valve closure member 156 is down, then air can no longer enter the chamber portion 152 and the piston 140 is then free to move upwardly. The valve closure member 156 has a valve stem 158 attached to it. The valve stem 158 has a horizontally extending arm 160 attached to it. The arm 160 has a second valve closure member 162 attached to its outer end, the member 162 being adapted to be received in a valve seat 164 in an air exhaust duct 166 which latter extends from the valve seat 164 outwardly through the outer housing 29 of the air chamber 134 for the exhausting of air from the upper chamber portion 152 of the air cylinder 142 to the atmosphere.

The valve seat 164 has inclined walls whereby when the valve closure member 162 is in an up position the valve is closed, and when the valve closure member 162 is in a down position the valve is open.

The valve stem 158 has a first telescoping member 170 disposed on it. The telescoping member 170 is in the form of a sleeve and has a closed upper end and an open lower end. The upper end of the sleeve has an opening therethrough for slidably receiving the valve stem 158.

The lower end of the sleeve telescoping member 170 is provided with an annular outwardly extending hook 172 extending around the lower end thereof and attached securely thereto. A second and larger telescoping member 174 is provided of a similar shape to the telescoping member 172. The member 174 slidably receives the member 172 therethrough. The member 174 has a third telescoping member 176 disposed on it. The member 176 is rigidly secured to the upper end of the piston 140 and it will be seen that the telescoping members will be pulled downwardly when the piston 140 moves downwardly.

Figure 5:
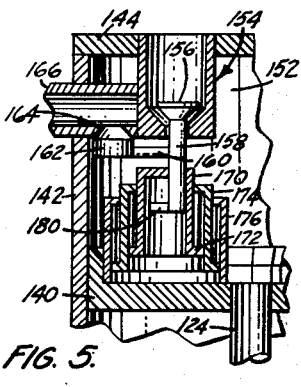
Figure 5 is an enlarged fragmentary detail view of the compressed air inlet valve which is part of the means for reciprocating the plunger.

It will be seen that the lowermost telescoping member 176 will pull downwardly on the flange foot at the bottom of the next uppermost member 174 which will in turn pull downwardly upon the flange foot 172 of the uppermost telescoping member 170, which will in turn pull downwardly upon a horizontally outwardly extending foot flange 180 on the bottom of the uppermost member, in other words the valve stem 158 whereby the valve will be forced into a closed position and simultaneously the exhaust dust 166 will be opened as best seen in Figure 5.

A horizontally disposed upper barrier wall 190 is provided extending from side to side of the housing 132. The wall 190 has a check valve 192 extending therethrough. The check valve has a ball at its center and the ball is adapted to be held in the valve and to seat against a valve seat indicated by the inclined walls 194. The ball will close the opening 196 between the main section of the interior of the valve and the hollow interior of a solenoid, the hollow interior being indicated at 198 and the solenoid being shown at 200.

The solenoid coil 200 has an inner casing 201 of cylindrical shape, which latter has a bottom wall having an opening therethrough in contact with the opening 196 of the valve. The solenoid coil 200 is adapted to pull downwardly upon a core 202. The core 202 is pushed upwardly by a coiled spring 204 which latter bears against a horizontal wall 206 which extends to and is supported by the upper edge of the cylindrical outer housing 29.

The upper end of the coil 204 fits against a shoulder 210 extending around the upper end of the core 202.

Above the core 202 is a coiled spring 220 which functions as a bumper spring and the spring 220 is suitably secured to the core 202 and is adapted to bump against a bearing surface 224 on the inner side of an upper dome 230 which forms an upper housing and which latter is secured suitably to the lower cylindrical housing 29 and as best seen at 232.

The upper dome 230 has an opening 234 therethrough for permitting air to enter and escape. The core 202 has a vertical passageway 240 extending downwardly therethrough and which latter has a valve 242 in its upper end, the valve 242 being adapted to permit air to enter downwardly therethrough for being adapted to prevent air from passing upwardly therethrough.

The solenoid core 202 further has a second passageway therethrough as seen at 248. The passageway 248 extends downwardly from the top of the core 202 and opens outwardly at the side of the core 202. The passageway 248 can be filled with lubricating oil which will then lubricate the motion of the core 202. The passageway 248 has an upper closure cap 250 and oil from it passes to a place between an upper piston ring 260 and a lower piston ring 262 on the core 202. The motions of the core 202 are controlled by means now to be described.

Figure 3:
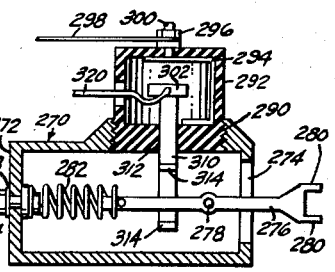
Figure 3 is a vertical section through a portion of the solenoid control switch.

First of all, a switch of a delay action over-center type is provided as shown at 270. The switch 270 is best seen in Figure 3 and includes a housing 272 having a slot 274 extending vertically therethrough for receiving an operating lever 276.

The lever 276 is pivotally secured to the housing 272 by an axle pin 278. The lever 276 is adapted to be normally horizontally disposed but to pivot about its axle pin 278. The right hand end of the lever 276 is wider than the remainder thereof for providing two horizontally extending fingers 280 extending outwardly therefrom to the right. The purpose of the fingers 280 is for engaging one of the coils 208 of the coil spring 204 whereby as the coil spring 204 expands upwardly the right hand end of the lever 276 will move upwardly.

The inner end of the lever 276 is pressed against by a coiled spring 282 which latter is suitably secured thereto in a manner such that the spring 282 will remain in place bearing against the inner end of the lever 276. The lever 282 is secured by a locking member 284 having a nut 286 and washer 288 to the housing 272.

On the upper side of the housing 272 the latter has a threaded opening 290. The opening 290 has an insulating smaller housing member 292 secured to it. The member 292 is threaded at its lower end and is threadedly secured in a threaded opening 290.

The insulating member 292 has one contact point 294 of a switch mounted thereon by means of a nut 296, which latter secures an electrical wire 298 to the post 300 of the contact point 294.

Just below the contact point 294 is another contact point 302 which latter is adapted to engage against a contact point 294. The point 302 is mounted upon a vertically slidable member 310 which is slidably disposed through a bottom aperture 312 through the upper housing 292.

The member 312 has two nibs 314 projecting outwardly from one side of it. The nibs 314 are disposed in spaced apart parallelism with each other and are spaced apart a considerably greater distance than the width of the lever 276 at adjacent joints.

As thus described, it will be seen that as the coil spring 204 expands that one of its coils 208 which is disposed between the fingers 280 will bump against the upper finger 280 at a time when the core 202 is approaching the upper end of its upper stroke. The lever 276 will then be rotated until it strikes the lower one of the nibs 314.

Then the lever will continue to move downwardly under the urge of the spring 282 which will then be in an over-center position. The contact member 302 will be pulled swiftly toward the contact member 294 with such speed that arcing will be held to a minimum.

This will then interconnect the wire 298 and a flexible wire 320 which is connected to the contact member 302 and extends through the side of the upper housing 292. It will be later described that this will make possible electrical contact to the solenoid from a source of electrical supply.

It will be seen that as the core 202 goes downwardly that one of the coils 302 of the spring 204 disposed between the fingers 280 will push downwardly on the lower finger 280 for forcing it downwardly until the coiled spring 282 passes over center and is in a position for forcing the inner end of the lever 276 upwardly. The lever 276 will then strike the nib 314 which is uppermost and will force the contact members 294 and 302 swiftly out of contact with a minimum of arcing, whereby the core 202 will then return upwardly under the influence of the spring 204.

As best seen in Figure 1 the wire 320 leads downwardly through an insulator 330 in the wall 206 and extends outwardly through an insulator 332 to a source of electrical supply of power.

Another wire 340 leads through the insulator 332 from the source of electrical power and extends downwardly and is attached at a terminal 342 to a time-delay mechanism 344 which is attached to the housing 29.

Figure 2:
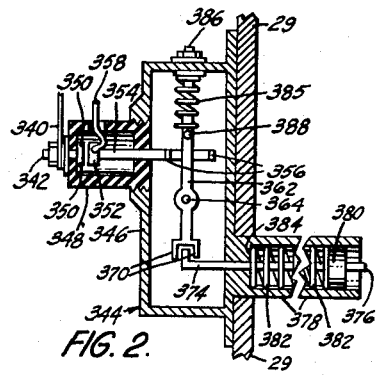
Figure 2 is a vertical section through a portion of the pressure switch mechanism.

The time-delay mechanism 344 is best seen in Figure 2 and comprises a main housing 346 secured suitably to the housing 29 and further has an insulating outer housing 348 threadedly secured to the housing 346. The terminal 342 extends inwardly through the housing 348 to a contact member 350 which latter is in contact normally with a contact member 352 which is mounted upon a slidable member 354.

The slidable member 354 is slidably disposed through the inner side of the housing 348 and has a wire 358 attached thereto, the wire 358 being flexible and especially so at that point of it which is inwardly of the housing 348.

The wire 358 extends through an insulator 360 in the housing 29 and extends to a terminal of a coil 200 of the solenoid. The other terminal of the solenoid coil is attached to the wire 298 previously described.

That portion of the slidable member 354 which is disposed inwardly of the housing 346 is provided with two parallel spaced apart dogs 356 which extend outwardly from one side thereof and are adapted to engage at different times a lever 362 which is pivotally mounted on a pin 364 supported on the housing 346. The lever 362 has a forked lower end having tines 370 which are spaced apart horizontally and which extend downwardly in vertical parallelism. The tines 370 are for the purpose of being engaged by an actuating end 374 of a piston rod 376 of a pressure switch which latter has a housing 378 extending through and secured to the housing 29 and extending into the air chamber 134.

The inner end of the pressure switch is constructed with a piston 380 disposed on the rod 376 in an adjustable manner whereby rotation of the rod 376 can adjust the position of the piston 380. The piston 380 is slidably mounted in the cylindrical housing 378 of the pressure switch and the piston 380 is adapted to move outwardly overcoming the pressure of a spring 382 which is disposed between the piston 380 and an outer wall 384 of the housing 378. Excess pressure in the air chamber 134 will cause outward movement of the piston 380 and the piston rod 376 for causing the actuating end 374 to push outwardly on the outwardmost tine 370 for rotating the lever 362 until the upper end of it forces the lower end of a coiled spring 385 to pass over-center to the right. The spring 385 is a compression spring and is attached by a bolt and nut 386 to the upper end of the housing 346 and extends downwardly and presses against a pin 388 which is disposed through the upper end of the lever 362.

When the lower end of the spring 385 passes over center to the right it will cause the upper end of the lever 362 to strike the right hand dog 356 suddenly for pulling the contact points 352 and 350 out of contact with one another suddenly and with a minimum of arcing.

When pressure in the air tank 134 is sufficiently low the contact points 350 and 352 will always be in contact.

A further safety feature is a pressure relief valve generally indicated at 400 at the right hand side of the housing 29, the valve 400 having a ball 402 and a spring 404. When the pressure in the air tank 134 is sufficiently great the ball 402 will be forced outwardly against the spring 404 for permitting air to pass outwardly through a passage in the valve 400. Whenever the air pressure in the air chamber 134 is not dangerously great the valve 400 will be closed.

As thus described each stroke of the core 202 of the air compressor does not cause a corresponding stroke of the piston 124 of the grease pump but the grease pump piston 124 operates as long as there is air pressure in the air chamber 134.

The pressure relief valve 400 operates only at times when the pressure switch 378 is out of order because pressure in the chamber 134 is controlled by the pressure switch 378 through its shutting off of the pumping action of the core 202 in normal operation. It is only when the pressure switch 378 is out of order that pressure in the tank 134 can become excessive to the point that the pressure relief valve 400 must operate for safety.

As thus described, it will be seen that this ejector is automatic in its operation and will make possible the use of grease directly from its delivery can without the labor of grease transfer and without danger of contamination by dust and dirt in the air.

From the foregoing description, it is thought to be obvious that a grease can receiving ejector constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A grease ejector having a lower portion and an upper portion, the lower portion having an upwardly extending cylindrical side wall adapted to receive an open grease can in inverted position thereon and having a bottom closure member closing the bottom end of said cylindrical side wall, a pipe upwardly extending from said bottom closure member and mounted thereon, said pipe having at least one aperture extending transversely into the upper end thereof, the upper end of said pipe being disposed closely adjacent the bottom of said inverted grease can at times when said can is received completely on said cylindrical wall, said upper portion having an under surface adapted to rest upon the up-turned bottom of said grease can and having a hollow cylindrical member extending downwardly therefrom beyond said under surface, said hollow cylindrical member being snugly and slidably receivable in and against the inner wall of said upwardly extending pipe, the opening in the hollow cylindrical member being disposed in registry with said aperture in the upper end of said pipe for the flow of grease through said opening and said aperture at times when said under surface of said upper portion is disposed against the up-turned bottom of said grease can; and grease pump means having a pumping chamber having inlet means disposed in communication with said cylindrical member and having outlet means from said chamber, check valves in said inlet and outlet means for cooperating with said pump to pump grease from said cylindrical member through said outlet means.

2. The construction defined in claim 1 in further combination with leverage means for attaching said upper member to said lower member in a manner whereby said means can be manipulated for employing said leverage to assist in the drawing of said upper member downwardly toward said can for the punching out of a section of the bottom of said can disposed between said downwardly extending cylindrical member and said upwardly extending pipe.

3. The combination described in claim 1 which further includes a downwardly extending annular circular flange disposed attached to and extending downwardly from the under side of said upper section, said flange being of a diameter slightly greater than the diameter of said cylindrical wall of said lower section so as to snugly receive the side wall of said can therein.

4. The device described in claim 1 in which said upwardly extending pipe is sharpened on its upper end for facilitating punching.

References Cited in the file of this patent

UNITED STATES PATENTS

| | | |
|---|---|---|
| 1,716,317 | Lowy | June 4, 1929 |
| 1,996,929 | Mays | Apr. 9, 1935 |
| 2,060,297 | Fox | Nov. 10, 1936 |
| 2,123,755 | Tear et al. | July 12, 1938 |
| 2,268,592 | Hothersall | Jan. 6, 1942 |
| 2,526,708 | Sundholm | Oct. 24, 1950 |